United States Patent
Sharma et al.

(10) Patent No.: US 6,424,352 B1
(45) Date of Patent: Jul. 23, 2002

(54) GENERATING INPUT PROFILE DATA

(75) Inventors: Abhay Kumar Sharma; Martin Philip Gouch; Daxa Neykumar Rughani, all of Herts (GB)

(73) Assignee: Fujifilm Electronic Imaging Limited, Herts (GB)

(*) Notice: Subject to any disclaimer, the term of this patent is extended or adjusted under 35 U.S.C. 154(b) by 0 days.

(21) Appl. No.: 09/338,886

(22) Filed: Jun. 23, 1999

(30) Foreign Application Priority Data

Jun. 25, 1998 (GB) .............................................. 9813682

(51) Int. Cl.7 ................................................. G09G 5/04
(52) U.S. Cl. ...................................................... 345/602
(58) Field of Search ........................ 345/88, 153, 154, 345/431, 589, 591, 593, 600, 601, 602, 603, 604, 605; 358/501, 504, 505, 518–520, 539

(56) References Cited

U.S. PATENT DOCUMENTS

| 5,528,261 A | * | 6/1996 | Holt et al. ................... 345/150 |
| 5,646,752 A | * | 7/1997 | Kohler et al. ................ 358/520 |
| 5,748,858 A | | 5/1998 | Ohtsuka et al. ............. 395/109 |
| 5,760,913 A | * | 6/1998 | Falk ............................ 358/298 |
| 5,963,201 A | * | 10/1999 | McGreggor et al. ........ 345/326 |
| 6,075,888 A | * | 6/2000 | Schwartz .................... 382/167 |

FOREIGN PATENT DOCUMENTS

EP 0 785 672 A1 7/1997 ............. H04N/1/60

* cited by examiner

Primary Examiner—Jeffery Brier
Assistant Examiner—G. F. Cunningham
(74) Attorney, Agent, or Firm—Sughrue Mion, PLLC

(57) ABSTRACT

A method of generating data representing an input profile defining a relationship between input color data generated by an input device and modified in accordance with a predetermined algorithm, and corresponding device independent data. The method comprises:

a) operating the input device on a range of predetermined input colors to generate said input color data;

b) processing said input color data in accordance with the predetermined algorithm to generate output data suitable for operating an output device;

c) converting said output data to said device independent data; and, d) generating said input profile data such that application of said input profile to said input color data substantially generates said device independent data.

18 Claims, 3 Drawing Sheets

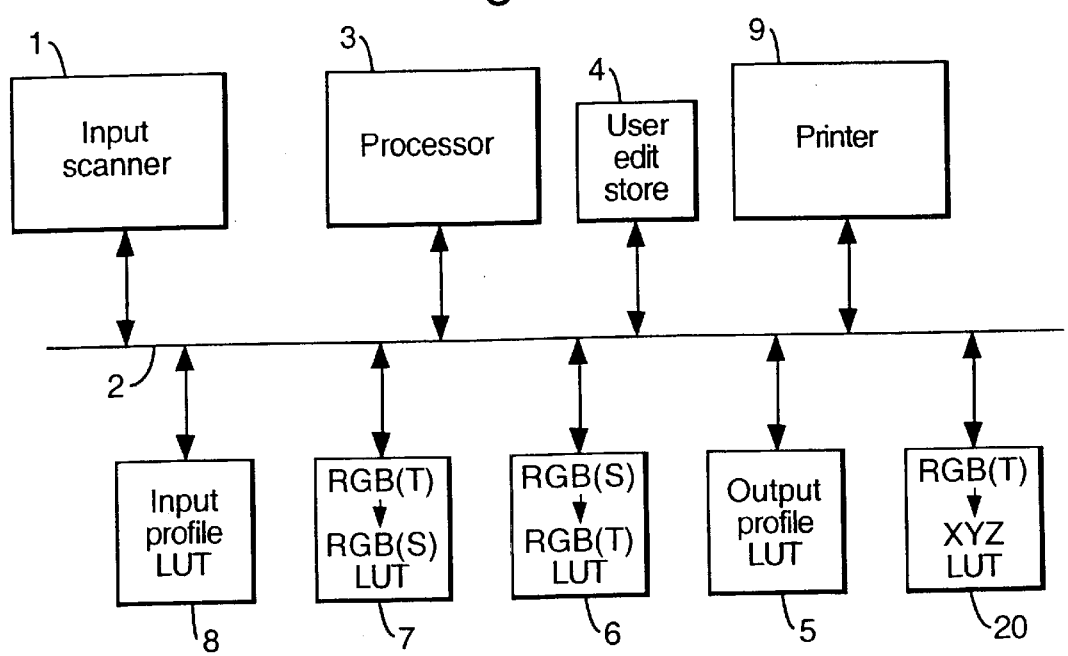

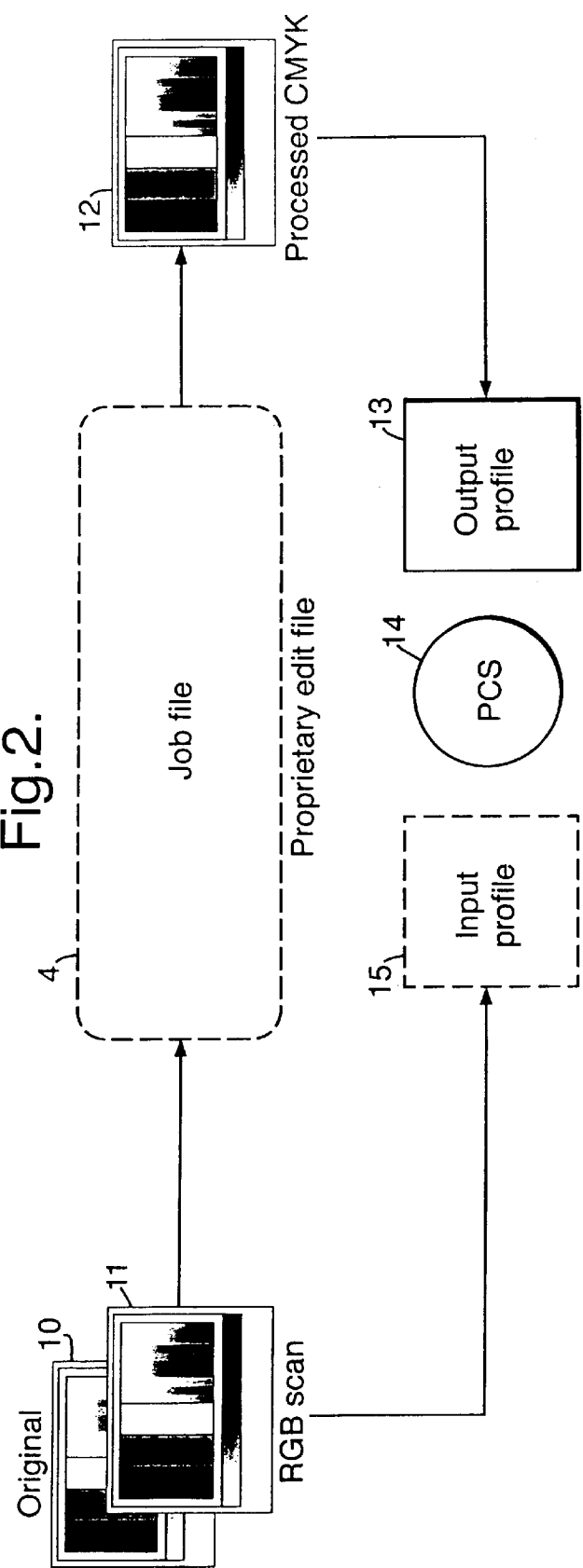

GENERATING INPUT PROFILE DATA

FIELD OF THE INVENTION

The invention relates to a method and apparatus for generating data representing an input profile.

DESCRIPTION OF THE PRIOR ART

In colour imaging technologies one of the major parts of the process is editing and changing the colours in an image. The changes can be aesthetic, e.g. a particular user may like very green grass or technical, e.g. to correct for a scanner with poor blue response. These user edits have until now been stored in individual company's proprietary file formats, i.e. a vendor-specific macro file that can only be used within that particular manufacturers environment. There now exists an internationally agreed file format for this user edit information. New colour imaging software will be ICC file format compatible. The proprietary user edit files cannot be used in the new ICC environment. Users will have spent many man-hours empirically/iteratively developing colour edits and will want to be able to retain these under the new ICC based software. Also users may want to switch from their current equipment to a different software or hardware configuration but retain the edits.

The conversion of proprietary user edit files into ICC profiles is not a straightforward task and at present is only carried out by the machine vendors who can convert their own user edit files into the standardised ICC format.

SUMMARY OF THE INVENTION

In accordance with one aspect of the present invention, a method of generating data representing an input profile defining a relationship between input colour data generated by an input device and modified in accordance with a predetermined algorithm, and corresponding device independent data comprises:

a) operating the input device on a range of predetermined input colours to generate said input colour data;

b) processing said input colour data in accordance with the predetermined algorithm to generate output data suitable for operating an output device;

c) converting said output data to said device independent data; and, d) generating said input profile data such that application of said input profile to said input colour data substantially generates said device independent data.

In accordance with a second aspect of the present invention, an image processing system comprises an input device for generating input colour data defining the colour content of pixels of an image; a processor for processing said input colour data in accordance with a predetermined algorithm to generate output data suitable for operating the output device, and for converting said output data to device independent data, and thereby generating input profile data representing an input profile defining a relationship between input colour data generated by the input device and modified according to the predetermined algorithm, and corresponding device independent data.

We also provide a record medium such as ROM, floppy disc, or CD which carries a computer program for carrying out step d) and preferably also step c).

This record medium could be supplied with an input device, an output device or separately.

We have developed a new method and system which enables users themselves to generate the required input profile corresponding to their own "user edits" or "predetermined algorithm" and does not require manufacturer intervention. In this process, the user arranges for a test chart to be scanned by the input device and the method analyses the effect of the predetermined algorithm on the data from the input device, after conversion to device independent data, and so creates a relationship (constituting the input profile) between the input colour data and the device independent data.

The predetermined algorithm may represent modifications needed to compensate for errors in the input device and/or the output device and/or could be used to impart desired colour modifications. These are all techniques which are implemented in conventional user edit files.

Thus, the invention may provide a method and apparatus for converting proprietary image edit files into files compatible with an "open" colour management system. The invention is a process to convert vendor-specific edit files into ICC compliant device profiles.

Typically, an output profile will be associated with the output device, that output profile modifying device independent data in a conventional way so as to be suitable for the output device. In that case, step c) preferably comprises applying said output data in reverse to an output profile associated with the output device. The reversed output profile may be constituted by an exact reversal of the output device profile or more usually a reduced resolution version. In that event, it may be necessary to carry out an iterative improvement process as well.

Although the method could be carried out on a range of input colours presented in sequence, preferably step a) is carried out using a test chart which presents the predetermined input colours at corresponding predetermined locations. This simplifies subsequent processing.

The device independent data will typically comprise profile connection space (PCS) data although other device independent colour spaces could be used. For convenience, "device independent colour space" will be referred to as PCS although this should not be restricted to the ICC definition of PCS. That ICC definition includes two main units of space data: PCS XYZ and PCS Lab.

Typically, the input colour data and the output data will be defined in different colour spaces, for example red, green, blue (RGB) and cyan, magenta, yellow, black (CYMK) although this is not essential and the predetermined algorithm could convert from one set of RGB values to another set of RGB values, i.e. within the same colour space.

BRIEF DESCRIPTION OF THE DRAWINGS

An example of system and method according to the invention will now be described with reference to the accompanying drawings, in which:

FIG. 1 is a block diagram of the system together with an output scanner;

FIG. 2 is a block flow diagram illustrating the process; and,

DETAILED DESCRIPTION OF A PREFERRED EMBODIMENT

Figure 3A:
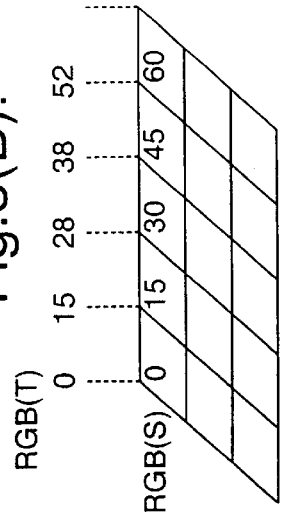
FIGS. 3A–3E illustrate schematically portions of look-up tables used in the generation of the input profile.

The system shown in FIG. 1 comprises an input scanner 1 such as a flat bed scanner which scans an image to generate input colour component data such as RGB data representing individual pixels of the image. The input scanner along with the other components is coupled to an address/data bus 2. A microprocessor 3 is responsive to a program stored on ROM (not shown) to process the image data as will be described below and makes use of information in a user edit store 4, an output profile LUT (look-up table) 5 and three further LUTs 6, 7 and 20. The resulting input profile data is stored by the processor 3 in an input profile LUT 8. As shown in FIG. 1, a printer 9 is also coupled to the bus 2 although this is not essential for operation of the present invention in order to generate the input profile data.

Conventionally, an image placed on the input scanner 1 is scanned and then the image data (typically representing Red, Green and Blue colour components for each pixel) is processed by the processor 3 with reference to the user edit data in the store 4 to generate output data suitable for operating the printer 9 such as CMYK data. As mentioned previously, the user edit data may change one or both of aesthetic and technical features in the scanned data.

The invention is concerned with replacing the user edits with an input profile. This is achieved as follows.

A test chart 10 (FIG. 2), such as an IT8.7/1 or IT8.7/2, is placed on the input scanner 1, the test chart having a range of colours (for example 288) in known physical locations. These may be organized in regular increments of R, G and B or colours whose content has been determined separately.

Normally the input profile relationship is determined using a mathematical fitting process between scanner RGB values and PCS values of the IT8 chart. It has been found that the limited number of points on the standard input scanner characterisation charts do not necessarily provide enough information to adequately mathematically describe the user edit functions involved. The invention therefore has been implemented by using a chart with a larger number of patches whose usage is better able to capture the relationship between RGB and PCS data. An empirical fitting technique has been used to generate the three dimensional relationship between these two parameters. A commercial example of a suitable chart is the Crosfield Midi-Mamba Colour Calibration Chart which has 4096 colour patches. The test chart is scanned by the input scanner 1 which generates RGB scan (or input colour) data 11. The processor 3 modifies the RGB scan data in accordance with the user edits in the store 4 and generates CMYK printer data in the form of dot percentage data 12 which, if applied to the printer 9, would result in an image being generated on a record medium. Instead, however, the CMYK data 12 are processed through a reversed part of an output profile 13 stored in the LUT 5 corresponding to the printer 9. When operated in a forward direction, this output profile 13 will convert profile connection space (PCS) data which is device independent to CMYK data suitable for operating the printer 9 while taking account of characteristics of the printer. When operated in reverse, the CMYK data is converted to PCS data 14.

A conventional output profile typically contains more than one conversion route and, for each route, defines forward and reverse LUTs. For this invention, it is preferred to use the perceptual route to achieve conversion from CMYK to PCS XYZ although other routes such as without gamut matching, with gamut matching, or with colour appearance model matching could be used.

It will now be seen that the processor 3 has available the initial RGB scan data 11 and the corresponding PCS data 14. The processor 3 can then compute a concordance or relationship between these two sets of data to generate the desired input profile data 15 which are stored in the LUT 8.

Subsequently, when a new image is scanned, the user edits 4 are no longer necessary and the scanned data will be processed by the newly created input profile 15. This then enables the scanner 1 to be connected to any printer 9 and yet enable the desired user edits to be carried out. It will be realized that the user edits 4 were only usable with the particular input scanner 10 and printer 9. If the input scanner 10 was connected to another printer, the user edits would need to be recalculated. With the invention, this is not necessary if the perceptual route is used.

We will now describe in more detail how the input profile 15 is generated.

Firstly, it should be understood that the input scanner 1 will introduce certain errors so that the RGB scan data 11 (RGB(S)) is not identical to the original, theoretical RGB (RGB(T)) of the test chart colours. Since the location of each pixel on the test chart is known, the theoretical values RGB(T) are known and these are used as addresses for a three dimensional look-up table 7 which stores at each address the corresponding RGB(S) value as shown at FIG. 3A. (FIGS. 3A–3E illustrate two dimensional slices through the 3D LUTs, the LUT addresses being shown within the grids and the content above the grid.)

Figure 3B:
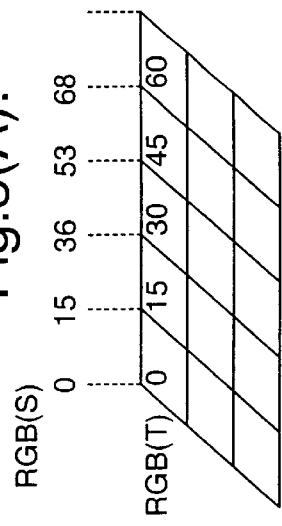
Figure 3E:
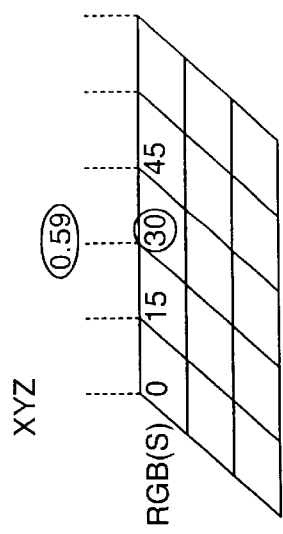

The processor 3 then inverts the LUT 7 and stores the resultant inverted data in the three dimensional LUT 6 (FIG. 3B). It should be noted that each LUT will always be addressed starting at address 0,0,0 and so it is not necessarily the case that an RGB(S) value will be used as an address. For example, the first RGB(S) value may have been 0,0,3 but the first address in the LUT 6 is 0,0,0. A suitable interpolation process is carried out to determine the RGB(T) value corresponding to each RGB(S) value corresponding to an address of the LUT 6.

In both LUTs 6,7, the grids are regularly spaced, while the values on the grid nodes reflect the nature of the functions.

Figure 3D:
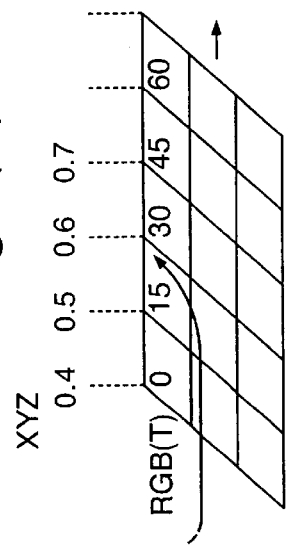

As described above, the result of applying data to the reversed output profile 5 is PCS data so that the processor 3 has a concordance between the theoretical RGB values (RGB(T)) and, in this example, the PCS XYZ data since the processor 3 knows for each pixel the RGB(T) and PCS XYZ data. This is shown in FIG. 3D and is stored in three dimensional LUT 20.

Figure 3C:
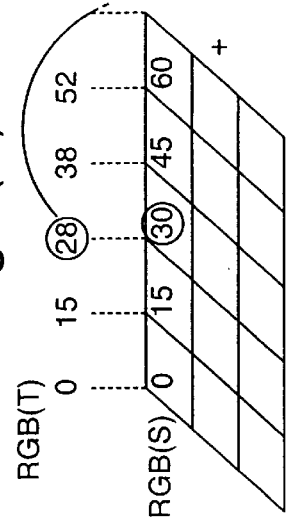

The final desired relationship is then derived (FIG. 3E) by concatenating the content of the store 6, shown again in FIG. 3C, with the RGB(T)-XYZ values (FIG. 3D) in the store 20.

Thus, suppose we are at RGB cube node 30. We look it up in the RGB(S) to RGB(T) store 6 as 28. 28 is a RGB(T) value and it is looked up in the RGB(T) to XYZ LUT 20. 28 falls between 15 and 30 so the XYZ value will be interpolated and will be between 0.5 and 0.6. As 28 is nearer 30, the final XYZ could be 0.59.

Thus, the final RGB(S) to XYZ LUT 8 has for RGB node 30 a value of 0.59 XYZ.

The process of conversion from CMYK to PCS XYZ relies on the perfect reversal of the output profile 13. When an image RGB value is processed to PCS XYZ it must be accurately converted back to CMYK through the forward part of the output profile 13 for the reproduction to match the original edit style. Thus, the forward and reverse modes of the output profile 13 must provide exactly opposite results, i.e. CMYK' to XYZ followed by XYZ to CMYK" needs to be such that CMYK' and CMYK" are nearly identical.

There are a number of reasons that this may not happen exactly.

The reverse mode of the output profile is normally only used for low resolution visual assessment and therefore will typically be stored at lower accuracy to minimise file size of the profile. Thus, it is likely to produce errors when the low resolution reverse mode is used followed by the high resolution forward mode.

The output profile is also essentially a LUT and this necessitates interpolation. Thus there will be interpolation errors involved when comparing forward and reverse results.

Finally there are inaccuracies in the process that underlies the original profile generation and these will be manifested as errors between inexact reversal of the output profile.

As there are a number of causes for the inexact reversal of the output profile the invention is preferably implemented with a simple modification to ensure reversibility of the output profile.

The modification is done by converting a CMYK chart value into PCS XYZ using the profile reverse mode and then testing to see if this PCS XYZ will produce the same CMYK when processed using the forward mode of the output profile. If the forward process does not provide a sufficiently close value then a search is done until a PCS XYZ is found such that it does produce a close enough CMYK value. This newly determined PCS XYZ value is then used for the input profile generation safe in the knowledge that it will produce the required CMYK value when processed through that output profile.

We claim:

1. A method of generating data representing an input profile defining a relationship between input colour data generated by an input device and modified in accordance with a predetermined algorithm, and corresponding device independent data, the method comprising:
    a) operating the input device on a range of predetermined input colours to generate said input colour data;
    b) processing said input colour data in accordance with the predetermined algorithm to generate output data suitable for operating an output device;
    c) converting said output data to said device independent data; and
    d) generating said input profile data such that application of said input profile to said input color data substantially generates said device independent data;
    wherein step c) comprises applying said output data to a reversed output profile associated with the output device.

2. A method according to claim 1, wherein the predetermined algorithm of step b) is specific to the input and output devices.

3. A method according to claim 1, wherein the output profile defines one or more conversion routes chosen from:
    a) without gamut matching,
    b) with gamut matching,
    c) with colour appearance model matching, and
    d) perceptual colour matching.

4. A method according to claim 1, wherein said step a) is carried out using a test chart which presents the predetermined input colours at corresponding predetermined locations.

5. A method according to claim 4, wherein the predetermined locations are organized in a regular array.

6. A method according to claim 1, wherein the device independent data comprises profile connection space data.

7. A method according to claim 1, wherein the input colour data and the output data define different colour spaces.

8. A method according to claim 7, wherein the input colour data and output data are chosen from RGB and CMYK data.

9. A method according to claim 8, wherein the input colour data is RGB and the output data is CMYK.

10. A method according to claim 8, wherein the input colour data is RGB and the output data is RGB.

11. An image processing system comprising an input device for generating input colour data defining the colour content of pixels of an image; a processor for processing said input colour data in accordance with a predetermined algorithm to generate output data suitable for operating the output device, and for converting said output data to device independent data, and thereby generating input profile data representing an input profile defining a relationship between input colour data generated by the input device and modified according to the predetermined algorithm, and corresponding device independent data, wherein the processor converts the output data by applying it to a reversed output profile associated with the output device.

12. A system according to claim 11, further comprising a look-up table for storing the input profile data.

13. A system according to claim 11, wherein the processor is adapted to carry out a method comprising the following steps:
    a) operating the input device on a range of predetermined input colours to generate said input colour data;
    b) processing said input colour data in accordance with the predetermined algorithm to generate output data suitable for operating an output device;
    c) converting said output data to said device independent data; and
    d) generating said input profile data such that application of said input profile to said input colour data substantially generates said device independent data.

14. A system according to claim 12, wherein the processor is adapted to carry out a method comprising the following steps:
    a) operating the input device on a range of predetermined input colours to generate said input colour data;
    b) processing said input colour data in accordance with the predetermined algorithm to generate output data suitable for operating an output device;
    c) converting said output data to said device independent data; and
    d) generating said input profile data such that application of said input profile to said input colour data substantially generates said device independent data.

15. A computer-readable storage medium storing a computer program for implementing a method of generating data representing an input profile defining a relationship between input colour data generated by an input device and modified in accordance with a predetermined algorithm, and corresponding device independent data, said method comprising the steps of:
    generating said input profile data such that application of said input profile to said input colour data substantially generates said device independent data;
    converting output data, previously generated in accordance with said predetermined algorithm, to said device independent data; and
    processing said input colour data in accordance with said predetermined algorithm to generate said output data, said output data being suitable for operating an output device; and wherein the converting step comprises applying said output data to a reversed output profile associated with the output device.

16. A computer-readable storage medium according to claim 15, wherein said computer program further comprises the step of operating the input device on a range of predetermined input colours to generate said input colour data.

17. A computer-readable storage medium according to claim 15, wherein said predetermined algorithm is specific to the input and output devices.

18. A computer-readable storage medium according to claim 15, wherein the output profile defines one or more conversion routes chosen from:

a) without gamut matching, b) with gamut matching, c) with colour appearance model matching, and d) perceptual colour matching.

\* \* \* \* \*